March 29, 1938.    J. E. DUBE    2,112,665
RELIEF VALVE
Filed Aug. 1, 1934
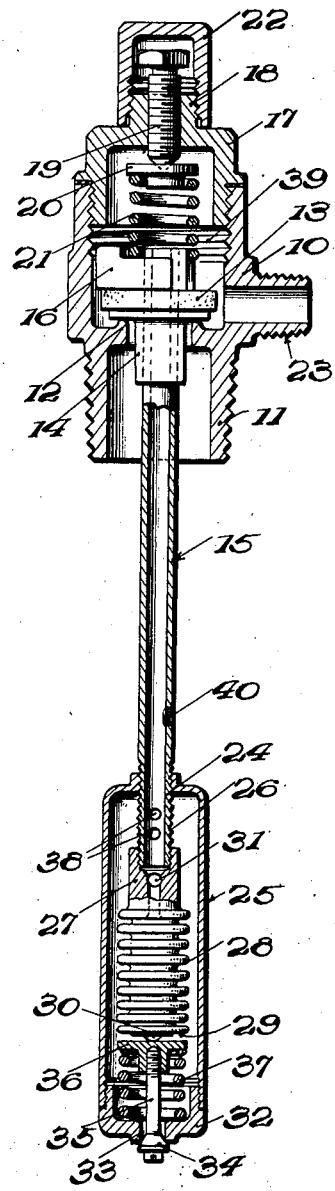
Inventor.
John E. Dube
By
Cameron, Kerkam + Sutton   Attorneys Patented Mar. 29, 1938

2,112,665

UNITED STATES PATENT OFFICE 2,112,665

RELIEF VALVE

John E. Dube, Knoxville, Tenn., assignor to The Fulton Sylphon Company, Knoxville, Tenn., a corporation of Delaware Application August 1, 1934, Serial No. 737,986

12 Claims. (Cl. 277—45)

This invention relates to relief valves, and more particularly to a valve which relieves when either the temperature or pressure has reached a predetermined maximum, and also preferably when the pressure has reached a predetermined minimum.

It has heretofore been proposed to provide a hot water tank with a combined temperature and pressure relief valve wherein the same valve member which is opened by the pressure of the water is also designed to be engaged and opened by a thermostat after reaching a predetermined degree of expansion. The pressure relief valve has been disposed exteriorly of the tank where it may be conveniently connected to a waste line and therefore the thermostat has also been disposed exteriorly of the tank where it may engage the relief valve member, but this has the disadvantage that the thermostat is not directly subjected to the temperature of the water in the tank but reliance must be placed on the heated water being circulated exteriorly of the tank and into heat interchanging relation with the thermostat. This provision of a circulating system from the tank to an external thermostat housing not only involves extra cost, extra piping, extra joints that may spring a leak, etc. but leaves no assurance that the thermostat is subjected to the hottest water in the tank, particularly in those systems which do not employ an external heater through which the water is circulated to and from the tank with the relief valve disposed in the connections between the heater and tank.

To overcome this difficulty it has also been proposed to employ a thermostat which has an elongated bulb extending into the tank into a zone of maximum temperature and a motor vessel exteriorly of the tank at the relief valve. Over and above the complexity thus introduced into the construction, this arrangement possesses a disadvantage, which is also common to the type of construction first referred to, that if the valve is to be opened when either a predetermined maximum temperature or pressure is reached independently of the other, in other words, to avoid the temperature rising until the pressure has relieved the valve or the pressure rising until the temperature has relieved the valve, a precisely determined and maintained relationship must exist between the two sources of control for the single valve member.

It is an object of this invention to provide a combined pressure and temperature relief valve wherein the temperature relief and the pressure relief are entirely independent of each other so that a tank or other closed system may be relieved when either a predetermined temperature or a predetermined pressure has been reached independently of the other.

Another object of this invention is to provide a device of the type characterized which does not require that the thermostat be disposed exteriorly of the tank or system and therefore avoids the need for additional piping, exterior thermostat housing, etc.

Another object of this invention is to provide a device of the type characterized which not only opens when either the temperature or pressure has reached a predetermined maximum, but which also opens when the pressure has reached a predetermined minimum and wherein the latter provision is independent of the means for controlling maximum temperature and pressure.

Another object of this invention is to provide a device of the type characterized which is simple in construction, inexpensive to manufacture and assemble, easy to install, and efficient in operation.

Another object of this invention is the removal of the bellows from normal direct contact with the water, which will prevent damage by corrosion or scale due to action of the water.

Other objects of the invention will appear as the description thereof proceeds.

The invention is capable of receiving a variety of mechanical expressions one of which is shown on the accompanying drawing, but it is to be expressly understood that the drawing is for purposes of illustration only and is not to be construed as a definition of the limits of the invention, reference being had to the appended claims for that purpose.

The drawing shows an embodiment of the invention in axial section.

In the form shown a valve housing 10 of any suitable size, construction and material is provided with a threaded nipple 11 by which it may be mounted in a tapped hole of a water tank, for example. Formed interiorly of said valve housing 10 is a valve seat 12, here shown as integral with the casing but a separate valve seat member may be employed if desired. Cooperating with said valve seat and guided by member 16 is a valve member 13 of any suitable size, character and construction, said valve member being shown as provided with tubular extensions 14, through which passes a pipe 15 secured thereto in any suitable way as by a threaded connection. Threaded to the end of the casing 10 opposite the nipple 11 is a bonnet member 17 which has an interiorly and exteriorly threaded nipple 18 at its outer end. Threaded into said nipple 18 is a set screw 19 which, at its inner end, engages a spring seat member 20 between which and the valve member 13 or, as here shown, the guiding member 16, is a coil spring 21. Said screw 19 extends to the exterior of the bonnet member 17 where it is readily accessible for adjustment, and if preferred a cover member 22 may be threaded on the nipple 18 to enclose the head of the set screw and prevent accidental or unauthorized variation of the adjustment. Valve casing 10 is also provided with a second nipple 23 which is designed to be connected with a waste line in any suitable way.

Pipe 15 is of such length that it will depend into the tank or other receptacle to such a point that the thermostat about to be described is located in the zone of maximum temperature. As shown the inner end of the pipe member 15 is threaded at 24, and mounted thereon is a tubular casing 25. The threaded end of the pipe 24 projects interiorly of the casing 25 as shown at 26 and suitably secured to the end of the pipe 15 as by the aforesaid threads is an interiorly threaded block 27 to which is attached one end of an expansible and collapsible chamber here shown as formed by a deeply corrugated, tubular metal wall or bellows 28 having one end suitably secured to said block 27. The opposite end of the bellows 28 has formed interiorly thereof or attached thereto an end wall 29 provided with a forwardly projecting boss 30. A filling opening for the chamber provided by the bellows 28 is shown at 31, and said chamber is designed to be completely filled with an expansible liquid, after which said aperture 31 is sealed in any suitable way. Suitably attached to the end of the casing 25 as by screw threads is an end member 32 provided with a valve port 33. Cooperating with said port 33 is a valve member 34 of any suitable construction attached to or formed on a stem 35 which, at its inner end, is threaded to a spring seat 36 which is also disposed for engagement by the boss 30 on the end wall of the expansible and collapsible chamber. Between said spring seat 36 and the inner end of the cover member 32 is disposed a coil spring 37. The end 26 of the pipe 15 within the casing 25 is provided with one or more apertures 38 so that fluid entering the casing 25 through the valve port 33 may pass through the pipe 15 and into the chamber 39 above the valve member 13. If preferred and as a measure of precaution the pipe 15 may also be provided with a fusible plug 40 so that if the thermostat becomes inoperative, an opening into 15 for the overheated water may be assured.

In operation the device is installed by threading the nipple 11 into a suitable tapped hole in the tank or other receptacle, with the depending thermostat housing 25 supported from the valve member 13 and located in the zone of maximum temperature within the tank or receptacle. The pressure of the fluid in said tank or receptacle acts on the inner face of the valve member 13 and when the pressure has reached a predetermined maximum, which may be determined by the adjustment of the spring 21 through manipulation of set screw 19, valve member 13 will be lifted from its seat against the tension of said spring 21 and permit the fluid to escape through the valve port to the chamber 39 and thence through the waste line connected to the nipple 23. If the temperature within the tank or other receptacle increases beyond a predetermined maximum the expansible and collapsible chamber 28 expands to engage the boss 30 with the spring seat member 36 and open the valve port 33 whereupon the fluid may flow through said port 33 and into the interior of the casing 25 and, as above referred to, out through the openings 38 and through the pipe 15 to the chamber 39, whence it escapes through the waste line. The resistance to the opening of the valve 34 may be adjusted by rotating the valve member so as to predetermine the tension of the spring 37. The member 36 may also be adjusted to advance or retard its engagement by the boss 30, by variably backing said member off or threading it to a variable extent onto the stem 35, thereby adjusting the temperature at which the thermostat opens the valve 34. If a vacuum is set up in the tank or receptacle the atmospheric pressure acting on the spring seat member 36, since the atmospheric pressure is admitted to the interior of the casing 25 through the waste line, chamber 39 and pipe 15, causes the valve member 34 to move away from its seat when the difference in pressure becomes such as to overcome the tension of the spring 37, the spring seat member 36 being free to move away from the boss 30.

It will therefore be perceived that by the present invention the pressure and temperature relief valves are entirely independent of each other in operation, the valve member 13 being opened by the pressure, when it has attained a predetermined maximum, irrespective of the temperature around the casing 25, and the valve 34 being opened when a predetermined temperature has been reached irrespective of the pressure acting on the valve member 13. Inasmuch as the temperature relief is disposed interiorly of the tank in the zone of maximum temperature no external piping or thermostat housing is required, and a simple form of expansible and collapsible chamber may be used for the thermostat. If a vacuum occurs the device also relieves independently of the relief for maximum temperature and pressure, and the minimum pressure to be maintained may be adjusted independently of the maximum pressure to be maintained. The device is also simple in construction, composed of relatively simple parts that are easy to manufacture and assemble, and the device is also easily installed and readily adjusted to predetermine both the temperature and the pressure at which the relief is to be effected.

While the embodiment of the invention illustrated on the drawing has been described with considerable particularity, it is to be expressly understood that the invention is not to be restricted thereto as the same is capable of receiving a variety of mechanical expressions, some of which will now readily suggest themselves to those skilled in the art while changes may be made in the details of construction, arrangement and proportion of parts and certain features used without other features without departing from the spirit of this invention. Reference is therefore to be had to the appended claims for a definition of the invention.

What is claimed is:—

1. In a relief valve, a valve housing adapted to be attached to a receptacle whose pressure is to be controlled, a valve member in said housing adapted to be subjected to the pressure in said receptacle to be opened thereby when it has reached a predetermined maximum, an outlet for waste from said valve housing, a thermostatically operated valve mechanism, and a pipe opening through said valve member and supporting said thermostatically operated valve mechanism at a point remote from said housing, said valve mechanism including a one-way connection between its valve member and thermostat, and said pipe providing a waste connection for leading waste from said valve mechanism to said outlet.

2. In a relief valve, a valve housing adapted to be attached to a receptacle whose pressure is to be controlled, a valve member in said housing adapted to be subjected to the pressure in said receptacle to be opened thereby when it has reached a predetermined maximum, an outlet for waste from said valve housing, a thermostat housing separate from said valve housing, means for supporting said thermostat housing from said valve member at a point remote from said housing, a valve member controlling admission of fluid to said thermostat housing, and a thermostat in said housing disconnected from but operatively related to said last named valve member to open the same upon movement of said thermostat in one direction, said supporting means providing means for leading waste from said thermostat housing to said first named housing and outlet.

3. In a relief valve, a valve housing adapted to be attached to a receptacle whose pressure is to be controlled, a valve member in said housing adapted to be subjected to the pressure in said receptacle to be opened thereby when it has reached a predetermined maximum, an outlet for waste from said valve housing, a pipe projecting through said valve member and communicating with said housing at the outlet side of said valve member, a thermostat relatively remote from said valve housing, a housing for said thermostat supported by and communicating with said pipe and adapted to subject said thermostat to a zone of high temperature in said receptacle, and means including a valve member adapted to be contacted by said thermostat but movable independently thereof for controlling the admission of fluid to said thermostat housing.

4. In a relief valve, a valve housing adapted to be attached to a receptacle whose pressure is to be controlled, a valve member in said housing adapted to be subjected to the pressure in said receptacle to be opened thereby when it has reached a predetermined maximum, an outlet for waste from said valve housing, a pipe projecting through and supported by said valve member and communicating with said valve housing on the outlet side of said valve member, a thermostat housing supported by and communicating with said pipe and adapted to be subjected to a zone of high temperature in said receptacle, a thermostat in said last named housing, and a valve member operatively connected to said thermostat but movable independently thereof for controlling the admission of fluid to said thermostat housing.

5. In a relief valve, a valve housing adapted to be attached to a receptacle whose pressure is to be controlled, a valve member in said housing adapted to be subjected to the pressure in said receptacle to be opened thereby when it has reached a predetermined maximum, and a thermostatically operated valve mechanism supported by said valve member at a point remote from said housing, said valve mechanism in operation being entirely independent of the operation of said pressure operated valve.

6. In a relief valve, a valve housing adapted to be attached to a receptacle whose pressure is to be controlled, a valve member in said housing adapted to be subjected to the pressure in said receptacle to be opened thereby when it has reached a predetermined maximum, means for adjusting said valve to predetermine the pressure at which said valve is opened, a thermostatically operated valve mechanism supported by said valve member at a point remote from said housing, said valve mechanism in operation being entirely independent of said pressure operated valve, and means for adjusting said thermostatically operated valve mechanism to predetermine the expansion of said thermostat before said valve is opened.

7. In a relief valve, a valve housing adapted to be attached to a receptacle whose pressure is to be controlled, a valve member in said housing adapted to be subjected to the pressure in said receptacle to be opened thereby when it has reached a predetermined maximum, an outlet for waste from said valve housing, a thermostatically operated valve mechanism, and means supported by said valve member for supporting said thermostatically operated valve mechanism and adapted to position the latter in said receptacle in the zone where the temperature is to be controlled, said thermostatically operated valve mechanism including a housing communicating with said outlet, a thermostat in said last named housing, and a valve member operatable by but unconnected to said thermostat and opening outwardly with respect to said thermostat housing, said thermostat housing being interiorly subjected to atmospheric pressure through said outlet whereby said last named valve is opened independently of said thermostat when the pressure in said receptacle has reached a predetermined minimum.

8. In a relief valve, a valve housing adapted to be attached to a receptacle whose pressure is to be controlled, a valve member in said housing adapted to be subjected to the pressure in said receptacle to be opened thereby when it has reached a predetermined maximum, an outlet for waste from said valve housing, a pipe supported by said valve member and communicating with said housing at the outlet side of said valve member, a second housing supported by said pipe and in communication therewith, a thermostat in said second housing, a valve for controlling the admission of fluid to said second housing, and means operatively connected to said valve and adapted to be engaged by said thermostat during expansion of said thermostat to open said valve, said last named means being separate from said thermostat and normally subjected to atmospheric pressure whereby said valve will be opened by atmospheric pressure independently of said thermostat when the pressure in said receptacle has reached a predetermined minimum.

9. In a relief valve, a valve housing adapted to be attached to a receptacle whose pressure is to be controlled, a valve member in said housing adapted to be subjected to the pressure in said receptacle to be opened thereby when it has reached a predetermined maximum, an outlet for waste from said valve housing, a pipe connected to said valve member and communicating with the interior of said housing on the outlet side of said valve member, a second housing supported by and communicating with said pipe, a thermostat mounted in said housing, a valve member cooperating with a port in said housing, a spring plate attached to said valve member and disposed in the path of expansion of said thermostat, and a spring cooperating with said plate and normally holding said valve member in closed position.

10. In a relief valve, a valve housing adapted to be attached to a receptacle whose pressure is to be controlled, a valve member in said housing adapted to be subjected to the pressure in said receptacle to be opened thereby when it has reached a predetermined maximum, an outlet for waste from said valve housing, a coil spring for opposing the opening of said valve, means cooperating with said spring and projecting to the exterior of said housing for predetermining the tension of said spring and thereby the pressure of said fluid required to open said valve, a pipe supported by said valve member and communicating with the interior of said housing at the outlet side of said valve member, a second housing supported by said pipe and communicating therewith, a thermostat in said second housing, a valve member cooperating with a port at that end of said second housing which is opposite said first named housing, and a member disposed in the path of expansion of said thermostat and engaged thereby to open said last named valve member.

11. In a relief valve, a valve housing adapted to be attached to a receptacle whose pressure is to be controlled, a valve member in said housing adapted to be subjected to the pressure in said receptacle to be opened thereby when it has reached a predetermined maximum, an outlet for waste from said valve housing, a coil spring for opposing the opening of said valve, means cooperating with said spring and projecting to the exterior of said housing for predetermining the tension of said spring and thereby the pressure of said fluid required to open said valve, a pipe supported by said valve member and communicating with the interior of said housing at the outlet side of said valve member, a second housing supported by said pipe and communicating therewith, a thermostat in said second housing, a valve member cooperating with a port in said second housing, a member disposed in the path of the expansion of said thermostat and connected to said last named valve member, a coil spring opposing movement of said last named member, and means whereby the tension of said last named spring may be adjusted.

12. In a relief valve, a valve housing adapted to be attached to a receptacle whose pressure is to be controlled, a valve member in said housing adapted to be subjected to the pressure in said receptacle to be opened thereby when it has reached a predetermined maximum, an outlet for waste from said valve housing, a pipe supported by said valve member and communicating with the interior of said housing at the outlet side of said valve member, a second housing supported by said pipe and communicating therewith, a thermostat in said second housing, a valve member cooperating with a port in said second housing, and means operatively relating said thermostat to said last named valve member.

JOHN E. DUBE.